(12) United States Patent
Trombley et al.

(10) Patent No.: US 10,109,932 B2
(45) Date of Patent: Oct. 23, 2018

(54) ELECTRICAL CLAMPS

(71) Applicant: Hubbell Incorporated, Shelton, CT (US)

(72) Inventors: Logan Michael Trombley, Manchester, NH (US); Brian McCulloh White, Creve Coeur, MO (US); Richard Ernest Robicheau, Litchfield, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/480,083

(22) Filed: Apr. 5, 2017

(65) Prior Publication Data

US 2017/0310023 A1    Oct. 26, 2017

Related U.S. Application Data

(60) Provisional application No. 62/325,014, filed on Apr. 20, 2016.

(51) Int. Cl.
*H01R 11/03*   (2006.01)
*H01R 4/46*   (2006.01)
*F16B 2/12*   (2006.01)

(52) U.S. Cl.
CPC ............... *H01R 4/46* (2013.01); *F16B 2/12* (2013.01)

(58) Field of Classification Search
CPC ... H01R 4/46; H01R 4/38; H01R 4/40; H01R 4/42; H01R 4/44
USPC ............... 439/785; 248/68.1, 231.41, 231.51
See application file for complete search history.

(56) References Cited

U.S. PATENT DOCUMENTS

| | | | | |
|---|---|---|---|---|
| 2,701,351 A | * | 2/1955 | Weber | H01R 4/38 439/781 |
| 2,898,573 A | | 8/1959 | Lamb | |
| 3,604,676 A | * | 9/1971 | Weber | F16L 3/1075 248/231.41 |
| 3,988,052 A | * | 10/1976 | Mooney | H01R 4/46 439/804 |
| 5,772,455 A | * | 6/1998 | Auclair | H01R 4/42 439/100 |
| 5,888,104 A | * | 3/1999 | Mello | E04F 15/024 439/100 |
| 6,011,218 A | | 1/2000 | Burek et al. | |
| 6,106,189 A | * | 8/2000 | Seale | F16B 7/0493 248/230.3 |

(Continued)

OTHER PUBLICATIONS

International Search Report and Written Opinion mailed in the corresponding PCT Application PCT/US17/26178 dated Jun. 29, 2017.

*Primary Examiner* — Tulsidas C Patel
*Assistant Examiner* — Peter G Leigh
(74) *Attorney, Agent, or Firm* — Wissing Miller LLP

(57) ABSTRACT

The present disclosure provides electrical clamps that can easily attach to a variety of shaped objects, such as fence posts and other objects for the purpose of establishing an electrical connection or conductive path between the electrical clamp, an object the electrical clamp is secured to, and a conductor attached to the electrical clamp. The electrical clamp utilizes an adjustable saddle construction that can be secured to the geometry of objects, such as a square, rectangular, round or oval geometry of the object, and a clamp cap construction that can electrically couple one or more conductors to the electrical clamp.

20 Claims, 13 Drawing Sheets

(56) References Cited

U.S. PATENT DOCUMENTS

| | | | | |
|---|---|---|---|---|
| 6,494,726 B1* | 12/2002 | Auclair | ............... | H01R 11/15 |
| | | | | 439/797 |
| 6,561,473 B1* | 5/2003 | Ianello | ............... | E04G 7/14 |
| | | | | 248/214 |
| 6,986,673 B2 | 1/2006 | de la Borbolla | | |
| 7,988,464 B2* | 8/2011 | Kossak | ............... | F16B 2/065 |
| | | | | 439/803 |
| 8,096,816 B2* | 1/2012 | Kossak | ............... | F16B 2/065 |
| | | | | 439/803 |
| 8,192,210 B2* | 6/2012 | Gardner | ............... | H01R 4/66 |
| | | | | 439/100 |
| 8,864,502 B2* | 10/2014 | Dinh | ............... | H01R 24/30 |
| | | | | 439/97 |
| 8,864,504 B1* | 10/2014 | Gretz | ............... | H01R 4/66 |
| | | | | 439/100 |
| 9,145,084 B2* | 9/2015 | Eboli | ............... | B60Q 1/0483 |
| 9,200,654 B1* | 12/2015 | Parduhn | ............... | F16B 7/0493 |
| 9,746,105 B2* | 8/2017 | Zhang | ............... | F16L 3/10 |
| 2010/0144173 A1 | 6/2010 | Wason | | |
| 2010/0144713 A1 | 6/2010 | Wason | | |
| 2010/0221935 A1 | 9/2010 | Rzasa et al. | | |
| 2011/0065333 A1 | 3/2011 | Ruland | | |
| 2012/0021658 A1 | 1/2012 | LaSalvia | | |
| 2012/0192399 A1* | 8/2012 | Dinh | ............... | F16B 5/0072 |
| | | | | 29/428 |
| 2013/0295786 A1 | 11/2013 | Dinh | | |

* cited by examiner

ELECTRICAL CLAMPS

CROSS REFERENCE TO RELATED APPLICATIONS

The present application is based on and claims benefit from U.S. Provisional Application Ser. No. 62/325,014 filed Apr. 20, 2016 entitled "Electrical Clamps" the entire contents of which is incorporated herein in its entirety by reference.

BACKGROUND

Field

The present disclosure relates generally to clamps used to establish electrical connections or a conductive path between conductors attached to the electrical clamps and objects the electrical clamps are secured to.

Description of the Related Art

In construction environments, power distribution systems, security perimeters and other systems and environments electrical conductors are often connected to metal objects for various reasons. For example, conductors are connected to metal housings or other metal objects to ground and/or electrically bond such metal housings or other metal object. As another example, conductors may be connected to bus bars to provide electrical power to branch circuits within a power distribution system. A current trend in such systems and environments is to build them to withstand environmental and human hazards. In some instances, this may include building larger and thicker walls to protect buildings, building larger and thicker walls in housings, or increasing the structural integrity of perimeter security structures. A result of this trend is the need to provide electrical connectors that can be secured to larger objects.

SUMMARY

The present disclosure provides descriptions of configurations for electrical clamps that provide features to easily attach the electrical clamp to a variety of shaped objects, such as fence posts and other objects for the purpose of connecting the objects to conductors to establish electrical connections or a conductive path between the conductors and the objects. As an example, the electrical clamp of the present disclosure can be secured to an object, and one or more conductors can be attached to the electrical clamp to facilitate grounding and/or electrical bonding of the object. The electrical clamp according to the present disclosure utilizes an adjustable saddle construction that can be secured to the geometry of objects, such as a square, rectangular, round or oval geometry of the object, and a clamp cap construction that can electrically couple one or more conductors to the electrical clamp.

In one exemplary configuration, the electrical clamp includes an upper saddle, a lower saddle, at least one fastener and at least one clamp cap. The upper saddle has a saddle body and at least one fastener capture portion positioned adjacent an end of the upper saddle body. The lower saddle has a saddle body and at least one lower saddle aperture positioned adjacent an end of the lower saddle body. The at least one fastener extends between the at least one fastener capture portion and the at least one lower saddle aperture, and at least one clamp cap has a body with a clamp cap aperture for receiving the fastener. The at least one clamp cap also has at least one conductor arm extending from the clamp cap body that is capable of receiving a conductor. In this configuration, the at least one fastener capture portion includes an aperture in the upper saddle body, a recess around the upper saddle aperture for receiving a portion of the fastener, a channel between the upper saddle aperture and an end of the upper saddle body that permits the fastener to pass through the channel into the upper saddle aperture, and at least one blocker positioned in the channel to block the at least one fastener from exiting the channel when the electrical clamp is secured to an object.

In another exemplary configuration, the electrical clamp includes an upper saddle, a lower saddle, at least one fastener and at least one clamp cap. The upper saddle has a saddle body and at least one fastener capture portion positioned adjacent an end of the upper saddle body. The lower saddle has a saddle body and at least one lower saddle aperture positioned adjacent an end of the lower saddle body. The at least one fastener extends between the at least one fastener capture portion and the at least one lower saddle aperture. The at least one clamp cap includes a body with a clamp cap aperture for receiving the fastener, at least one conductor arm extending from the clamp cap body and capable of receiving a conductor, and at least one rotation blocking member positioned to engaged the lower saddle body to block rotation of the at least one clamp cap relative to the lower saddle body when the electrical clamp is secured to an object. In this configuration, the at least one fastener capture portion includes an aperture in the upper saddle body, a recess around the upper saddle aperture for receiving a portion of the fastener, a channel between the upper saddle aperture and an end of the upper saddle body that permits the fastener to pass through the channel into the upper saddle aperture, and at least one blocker positioned in the channel to block the at least one fastener from exiting the channel when the electrical clamp is secured to an object.

In another exemplary configuration, the electrical clamp includes an upper saddle, a lower saddle, at least one fastener and at least one clamp cap. The upper saddle has a saddle body and at least one fastener capture portion positioned adjacent an end of the upper saddle body. The lower saddle has a saddle body and at least one lower saddle aperture positioned adjacent an end of the lower saddle body. The at least one fastener extends between the at least one fastener capture portion and the at least one lower saddle aperture. In this configuration, the at least one clamp cap includes a body with a clamp cap aperture for receiving the fastener, at least one conductor arm extending from the clamp cap body and capable of receiving a conductor, and at least one rotation blocking member positioned to engaged the lower saddle body to block rotation of the at least one clamp cap relative to the lower saddle body when the electrical clamp is secured to an object.

BRIEF DESCRIPTION OF THE DRAWINGS

The figures depict configurations for purposes of illustration only. One skilled in the art will readily recognize from the following description that alternative configurations of the structures illustrated herein may be employed without departing from the principles described herein, wherein.

DETAILED DESCRIPTION

Figure 1:
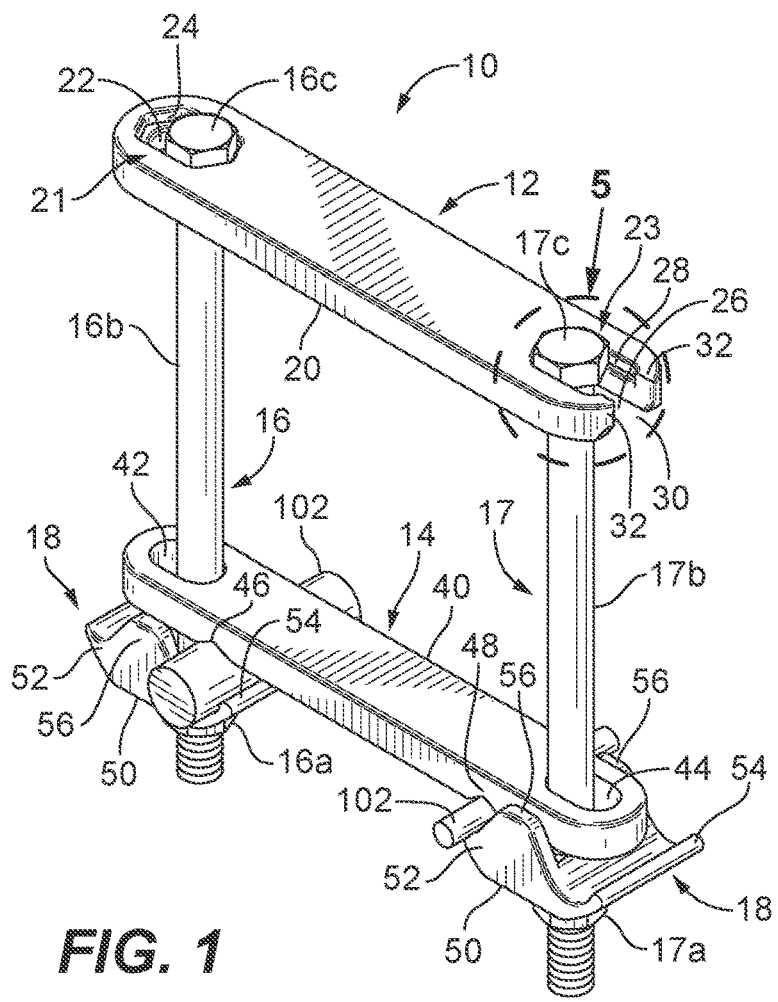
FIG. 1 is a top perspective view of an exemplary configuration of an electrical clamp according to the present disclosure.
Figure 5:
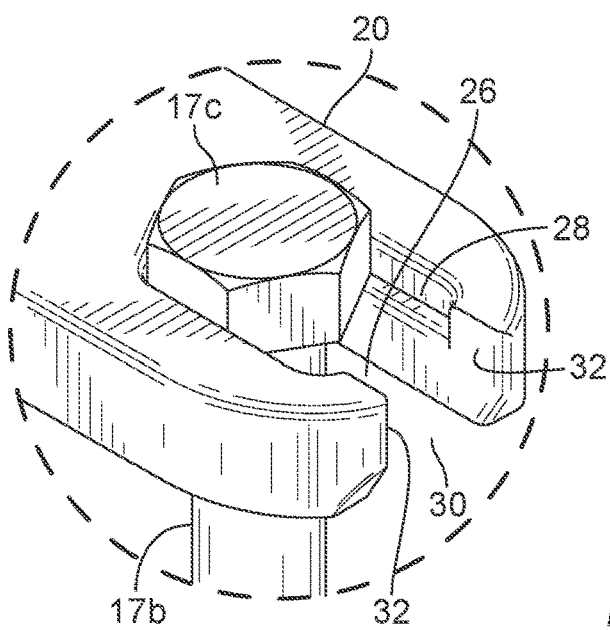
FIG. 5 is an enlarged view of a fastener caption portion of an upper saddle of the electrical clamp of FIG. 1.
Figure 2:
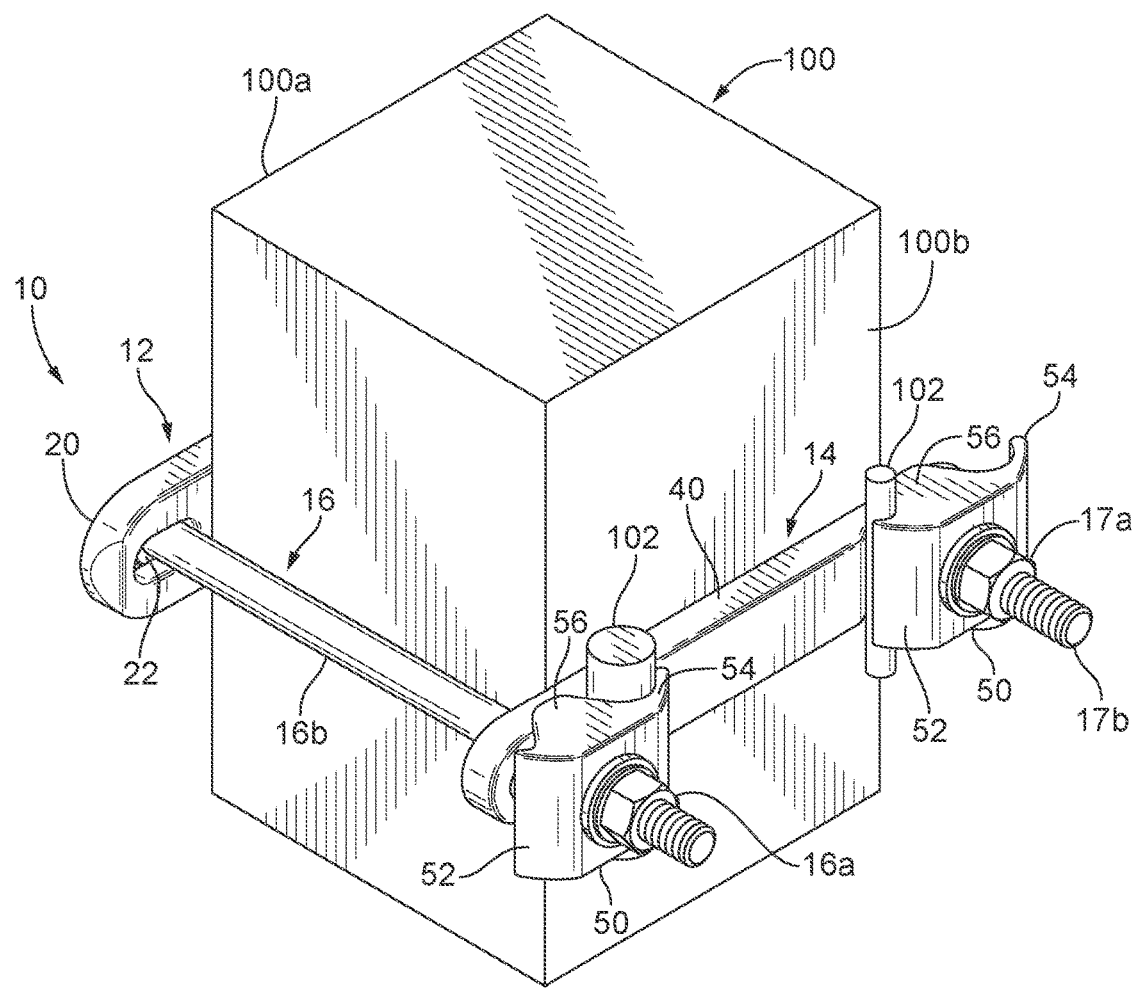
FIG. 2 is a top perspective view of the electrical clamp of FIG. 1 secured to an object having a square geometry.

The present disclosure provides descriptions of configurations for electrical clamps used to connect objects to conductors to establish electrical connections or a conductive path between the conductors and the objects. As an example, the electrical clamp of the present disclosure can be secured to an object and one or more conductors can be attached to the electrical clamp to facilitate grounding and/or electrical bonding the object. Objects as used herein includes any equipment, components, devices, structures, and any other article or thing that can be seen and/or touched. Examples of objects include construction equipment and structures, buildings and housings, power distribution equipment and systems, electrical equipment, any potentially electrically charged components or equipment, and any other objects that may be connected to conductors. Examples of objects also include electrical devices and components, such as bus bars, raceways, and photovoltaic array rail systems. Examples of objects also include structural components, such as metal fencing and fence posts.

This specification and the accompanying drawings are to be regarded in an illustrative sense rather than a restrictive sense. Various modifications may be made thereto without departing from the spirit and scope of the present disclosure.

Referring to FIGS. 1-7, an exemplary configuration of an electrical clamp according to the present disclosure is shown. In this exemplary configuration, the electrical clamp 10 has an upper saddle 12 and a lower saddle 14 that are interconnected via fasteners 16 and 17, such as threaded nuts and bolts, and one or more clamp caps 18. The upper saddle 12 has a saddle body 20 that is configured to span an object that the electrical clamp 10 is to be secured to. For example, and referring to FIG. 2, the object 100 can be a square 4"×4" metal fence post so that the saddle body 20 spans and extends past the width of a side 100a of the object 100, e.g., the fence post, as shown. The upper saddle 12 also includes a first fastener caption portion 21 that permits a fastener 16 to pass through the saddle body 20 to facilitate securing the electrical clamp 10 to an object 100. In an exemplary configuration, the first fastener caption portion 21 includes a first aperture 22 adjacent one end of the saddle body 20 that permits bolt 16b to pass through the saddle body. The first aperture 22 may be an elongated slot that permits the bolt 16b to slide, e.g., to slide longitudinally, within the elongated slot until tightened. The first fastener caption portion 21 may also include a first recess 24 within the saddle body 20 that is positioned around the first aperture 22 as shown. The first fastener caption portion 21 is configured and dimensioned to receive at least a portion of a head 16c of the fastener 16 so as to prevent the fastener head 16c from rotating when tightening the fastener 16, e.g., when tightening the nut 16a to the bolt 16b.

The upper saddle 12 also includes a second fastener caption portion 23 that permits a fastener 17 to pass through the saddle body 20 to facilitate securing the electrical clamp 10 to an object 100. In an exemplary configuration, the second fastener caption portion 23 includes a second aperture 26 adjacent the other end of the saddle body 20 that permits bolt 17b to pass through the saddle body. The second aperture 26 may be an elongated slot that permits the bolt 17b to remain movable, e.g., to slide longitudinally within the elongated slot, until tightened. The second fastener caption portion 23 may include a second recess 28 in the saddle body 20 that is positioned around the second aperture 26 as shown. The second recess 28 is configured to receive at least a portion of a head 17c of fastener 17 to prevent the fastener head 17c from rotating when tightening to the fastener 17, e.g., when tightening nut 17a to bolt 17b. In this configuration, an end of the saddle body 20 adjacent to the second aperture 26 includes a channel 30 that extends between the aperture 26 and an outer edge of the saddle body 20. The channel 30 permits the fastener 17, e.g., bolt 17b, to pass from the outer edge of the saddle body 20 through the channel 30 and rest in the aperture 26 and recess 28. The channel 30 facilitates the quick and easy installation of the electrical clamp 10 around the object 100, and allows the electrical clamp 10 to be attached to the object 100 without the need to completely disassemble the electrical clamp. To prevent the head 17c of the fastener 17 from easily sliding out of the channel 30, blockers 32 are formed into or secured to the channel 30. The blockers 32 block the fastener, e.g., the head 17c of the fastener 17, from sliding along the recess 28 and out of the channel 30.

Continuing to refer to FIGS. 1-7, the lower saddle 14 has a saddle body 40 that is configured to span an object 100 that the electrical clamp is to be secured to. For example, and referring again to FIG. 2, the object 100 is a square 4"×4"

metal fence post so that the saddle body 40 spans and extends past the width of a side 100*b* of the object 100, e.g., the fence post, as shown. Preferably, the upper saddle body 20 and the lower saddle body 40 have substantially the same length "Ls" (seen in FIG. 3), substantially the same width "Ws" (seen in FIG. 4), and substantially the same thickness "Ts" (seen in FIG. 3). However, the length "Ls," width "Ws," and thickness "Ts" of each saddle body 20 and 40 may differ to accommodate the object that the electrical clamp 10 is to be secured to. The saddle body 40 also includes a first aperture 42 adjacent one end of the saddle body 40. The first aperture 42 is aligned with aperture 22 in the upper saddle body 20. In this exemplary configuration, this aperture alignment permits the fastener, e.g., bolt 16*b*, to pass through aperture 22 in the upper saddle 12 and through aperture 42 in the lower saddle 14. The first aperture 42 may be an elongated slot that permits the fastener, e.g., bolt 16*b*, to remain movable within the elongated slot until tightened. The lower saddle 14 also includes a second aperture 44 adjacent the other end of the saddle body 40. The second aperture 44 is aligned with aperture 26 in the upper saddle body 20. In this exemplary configuration, this aperture alignment permits fastener, e.g., bolt 17*b*, to pass through aperture 26 in the upper saddle 12 and through aperture 44 in the lower saddle 14. The second aperture 44 may be an elongated slot that permits the fastener, e.g., bolt 17*b*, to remain movable within the elongated slot until tightened. The lower saddle 14 may also include conductor notches 46 and 48 that are configured to receive a portion of a conductor 102 to better ensure a tight electrical connection between the lower saddle body 40, the respective clamp cap 18, and the conductor 102. The conductor notches 46 and 48 may come in many shapes, such as V-shape and U-shape. The conductor notches 46 and 48 may also include knurling or teeth along the surface area of the conductor notches to engage the conductor 102 when the electrical clamp 10 is secured to an object 100 for a better electrical connection between the lower saddle body 40, the respective clamp cap 18, and the conductor 102.

Figure 3:
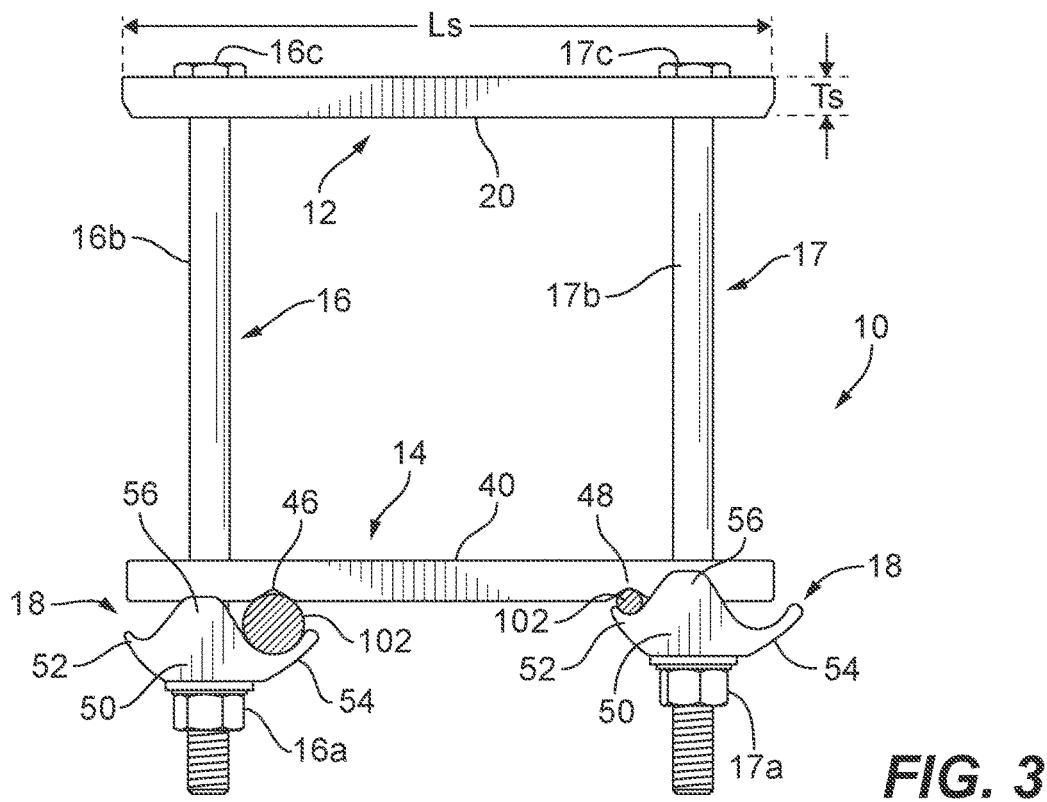
FIG. 3 is a front elevation view of the electrical clamp of FIG. 1.
Figure 4:
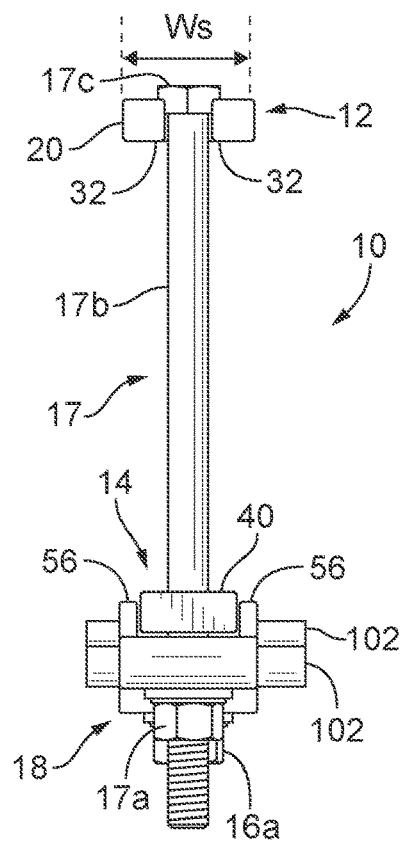
FIG. 4 is a side elevation view of the electrical clamp of FIG. 1.
Figure 6:
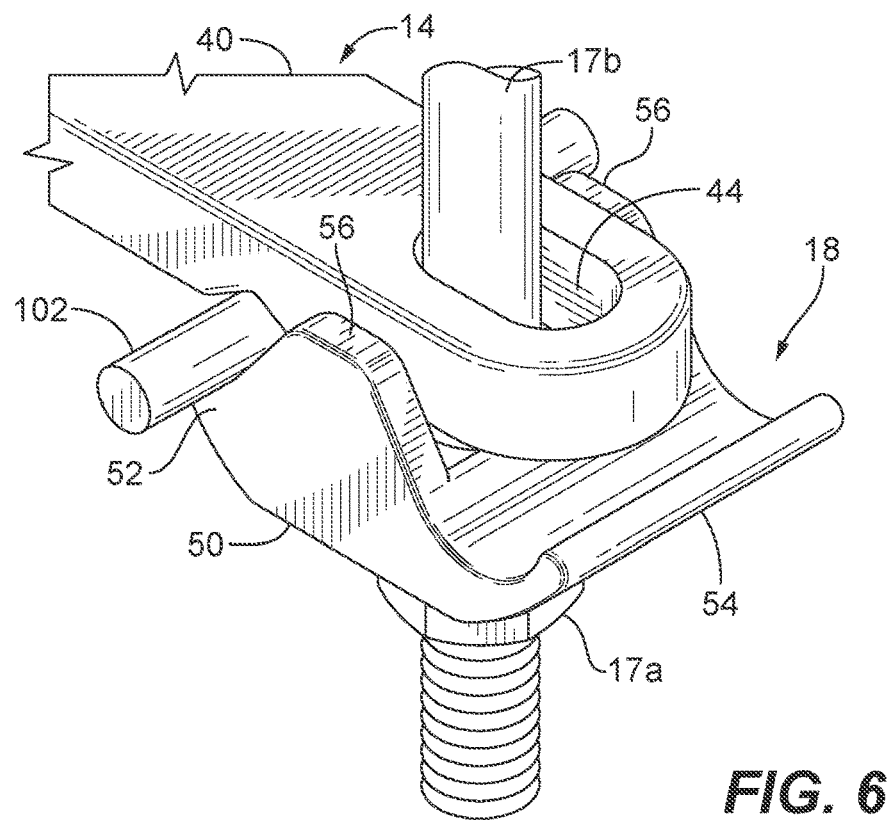
FIG. 6 is an enlarged view of a conductor clamping portion of a lower saddle and clamp cap of the electrical clamp of FIG. 1.
Figure 7:
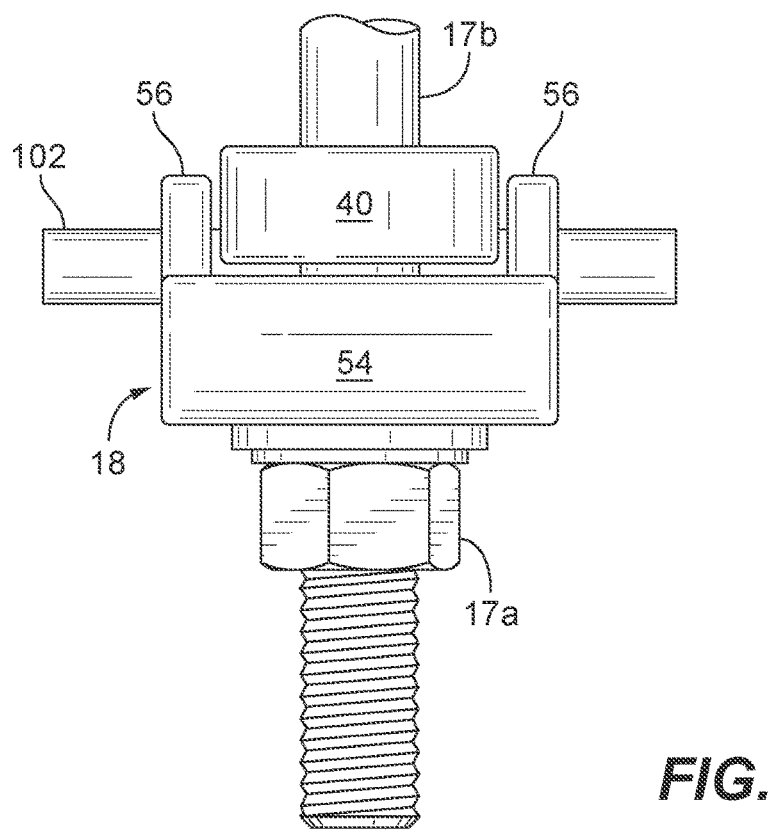
FIG. 7 is a side elevation view of the conductor clamping portion and the clamp cap of FIG. 6.

Referring to FIGS. 3, 6 and 7, as noted the electrical clamp 10 includes one or more clamp caps 18. As noted, the clamp caps 18 are used to electrically couple the electrical clamp 10 to electrical conductors 102. Each clamp cap 18 includes a cap body 50 having an aperture through which the fastener 16 or 17, e.g., bolt 16*b* or 17*b*, can pass so that the clamp cap can be secured to the lower saddle 14 when the electrical clamp 10 is secured to an object. Each cap body 50 has one or more conductor arms 52 and 54 on which an electrical conductor 102 can rest. The clamp cap 18 shown in FIGS. 6 and 7 has two conductor arms 52 and 54, where one conductor arm, e.g., conductor arm 52, can be configured to receive electrical conductors of a first conductor size range, and the other conductor arm, e.g., conductor arm 54, can be configured to receive electrical conductors of a second conductor size range. As an example, but not limited to the first conductor size range may be from about 6 AWG to about 1/0 AWG, and the second conductor size range may be from about 2/0 AWG to about 250 Kcmil.

In addition, each clamp cap 18 includes at least one rotation blocking member 56 that prevents the clamp cap 18, and thus the conductor, from rotating relative to the lower saddle 14 when tightening the electrical clamp 10 to an object. In the configuration shown in FIGS. 6 and 7, a pair of rotation blocking members 56 are secured to or integrally formed into the cap body 50. The rotation blocking members 56 extend from the cap body 50 toward the saddle body 40 of the lower saddle 14, seen in FIG. 1, such that when the electrical clamp 10 is secured to the object 100, seen in FIG. 2, the rotation blocking members extend past at least a portion of the lower saddle body 40. In this configuration, the saddle body 40 rests between the rotation blocking members 56 when the electrical clamp 10 is secured to the object 100, as seen in FIG. 7, so that a conductor 102 resting on the conductor arm 52 or 54 is aligned with the conductor notches 46 or 48, shown in FIG. 1, in the saddle body 40, as seen in FIG. 7. In addition to aligning the conductor with a conductor notch, the rotation blocking members 56 block rotational movement of the clamp cap 18 relative to the lower saddle 14, as shown in FIG. 1. Blocking rotation of the clamp cap 18 minimizes twisting or rotating of the conductor 102 that may degrade the electrical connection between the lower saddle 14 and the clamp cap 18 when securing the electrical clamp 10 to an object.

Figure 8:
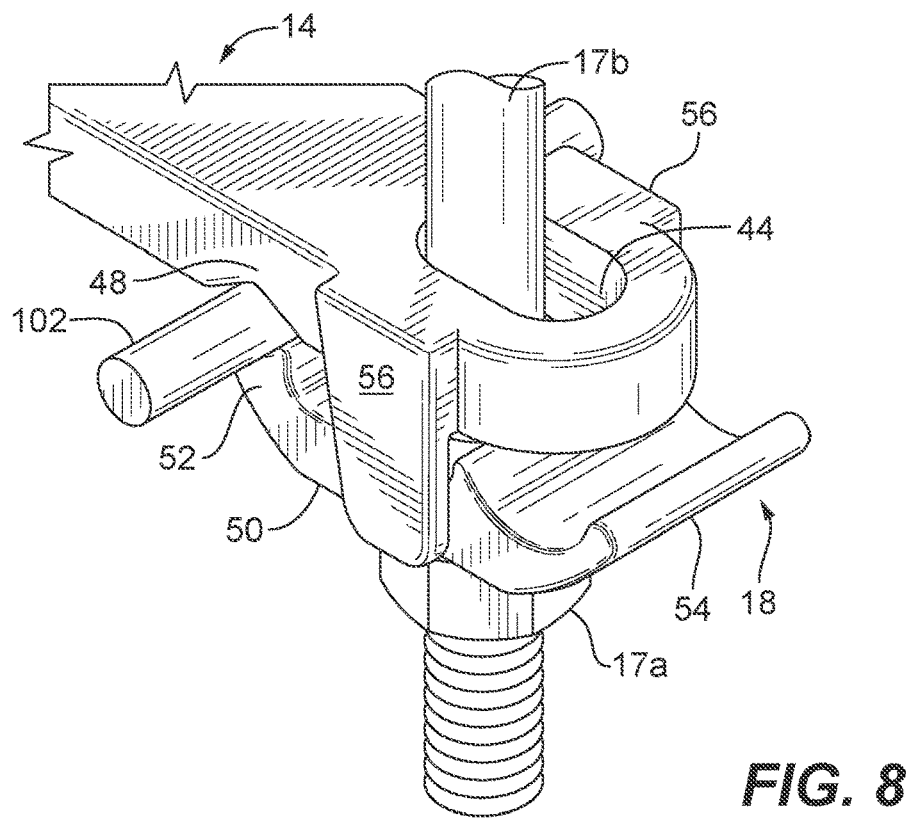
FIG. 8 is a top perspective view of another exemplary configuration of an electrical clamp according to the present disclosure.
Figure 9:
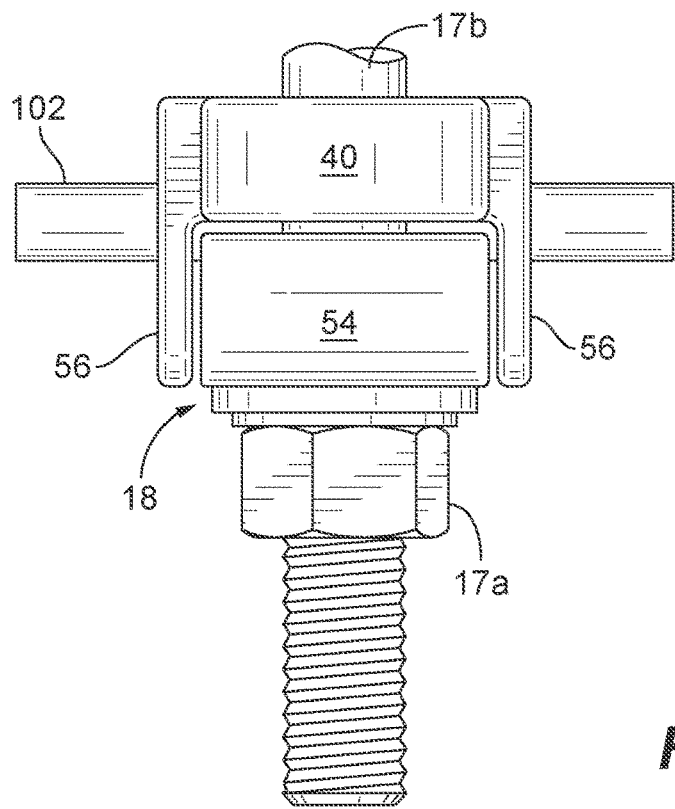
FIG. 9 is an enlarged view of a fastener caption portion of the upper saddle of the electrical clamp of FIG. 8.

In another configuration shown in FIGS. 8 and 9, the one or more rotation blocking members 56 may be secured to or integrally formed into the lower saddle body 40 so that they extend from the saddle body toward the clamp cap 18. In this configuration, when the electrical clamp 10, seen in FIGS. 1 and 3, is secured to an object 100 the rotation blocking members 56 extend past at least a portion of the cap body 50 so that the cap body 50 rests between the rotation blocking members 56, as seen in FIG. 9, and a conductor 102 resting on a conductor arm 52 or 54 is aligned with a conductor notch 46 or 48 in the saddle body 40, as seen in FIG. 8. In addition to aligning the conductor 102 with a conductor notch 48, the rotation blocking members 56 block rotational movement of the clamp cap 18 relative to the lower saddle 14, as shown in FIG. 1. As noted above, blocking rotation of the clamp cap 18 minimizes twisting or rotating of the conductor 102 that may degrade the electrical connection between the lower saddle 14 and the clamp cap 18 when securing the electrical clamp 10 to an object.

Figure 10:
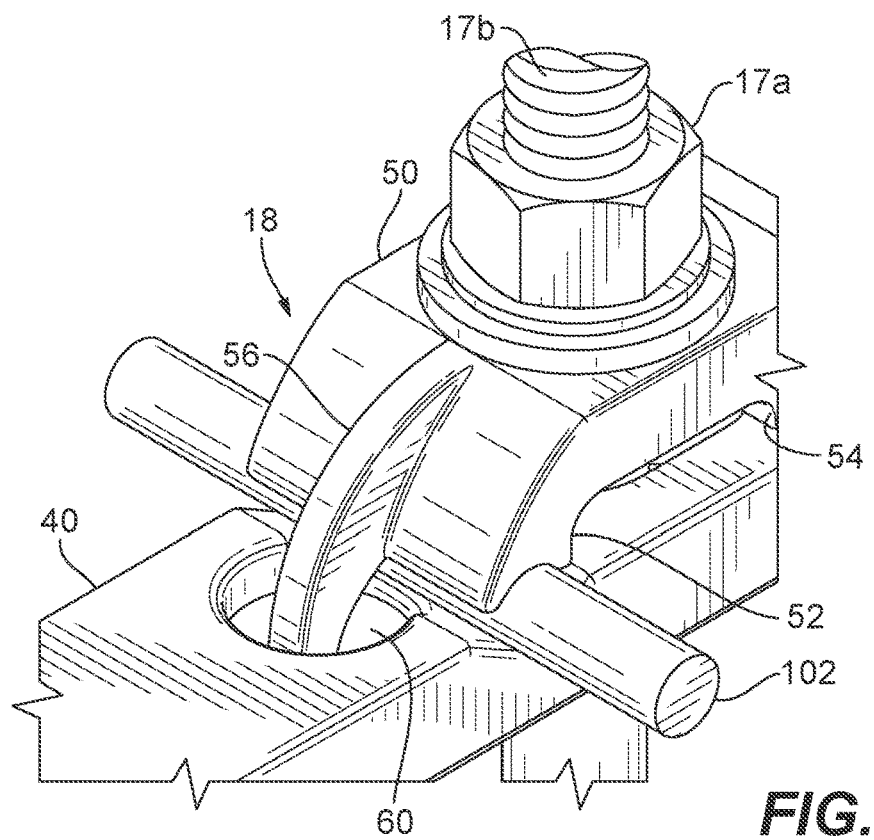
FIG. 10 is a top perspective view of another exemplary configuration of an electrical clamp according to the present disclosure.
Figure 11:
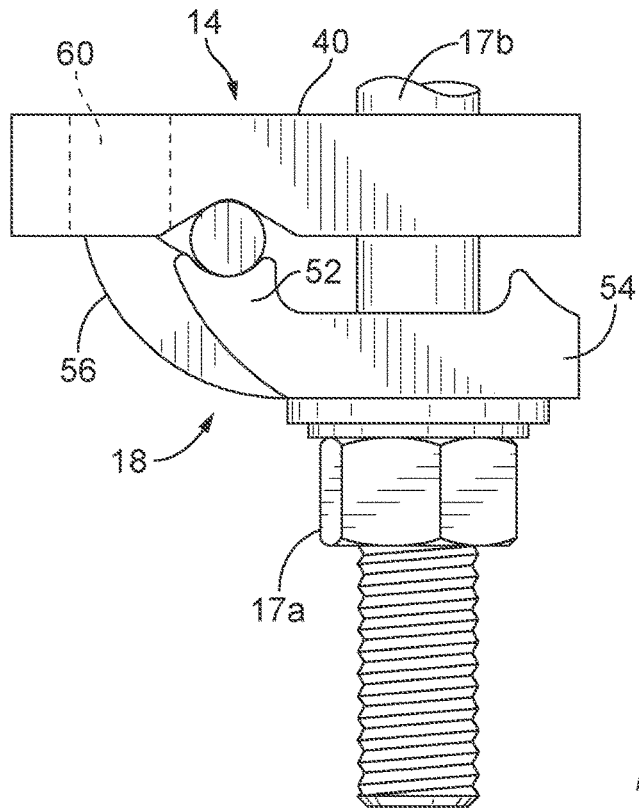
FIG. 11 is an enlarged view of a fastener caption portion of the upper saddle of the electrical clamp of FIG. 10.

In another configuration shown in FIGS. 10 and 11, the at least one rotation blocking member 56 includes a post secured to or integrally formed into each conductor arm 52 and 54, or in the cap body 50. In the configuration shown, the post is integrally formed into rotation blocking member 56. The rotation blocking member 56, here the post, extends from the conductor arm 52 toward the lower saddle 14, such that when the electrical clamp 10 is secured to an object 100 the rotation blocking member 56 extends into an aperture 60 in the lower saddle body 40. In this configuration, when the electrical clamp 10 as shown in FIGS. 1 and 3 is secured to an object 100 the post is in rotation blocking member 56 rests within the aperture 60 so that a conductor 102 resting on a conductor arm 52 or 54 is aligned with a conductor notch 46 or 48 as shown in FIG. 1 in the saddle body 40, as shown. In addition to aligning the conductor 102 with a conductor notch 46 or 48, the rotation blocking member 56 blocks rotational movement of the clamp cap 18 relative to the lower saddle 14. As noted, blocking rotation of the clamp cap 18 minimizes twisting or rotating of the conductor 102 that may degrade the electrical connection between the lower saddle 14 and the clamp cap 18 when securing the electrical clamp 10 as shown in FIGS. 1 and 3 to an object.

Figure 12:
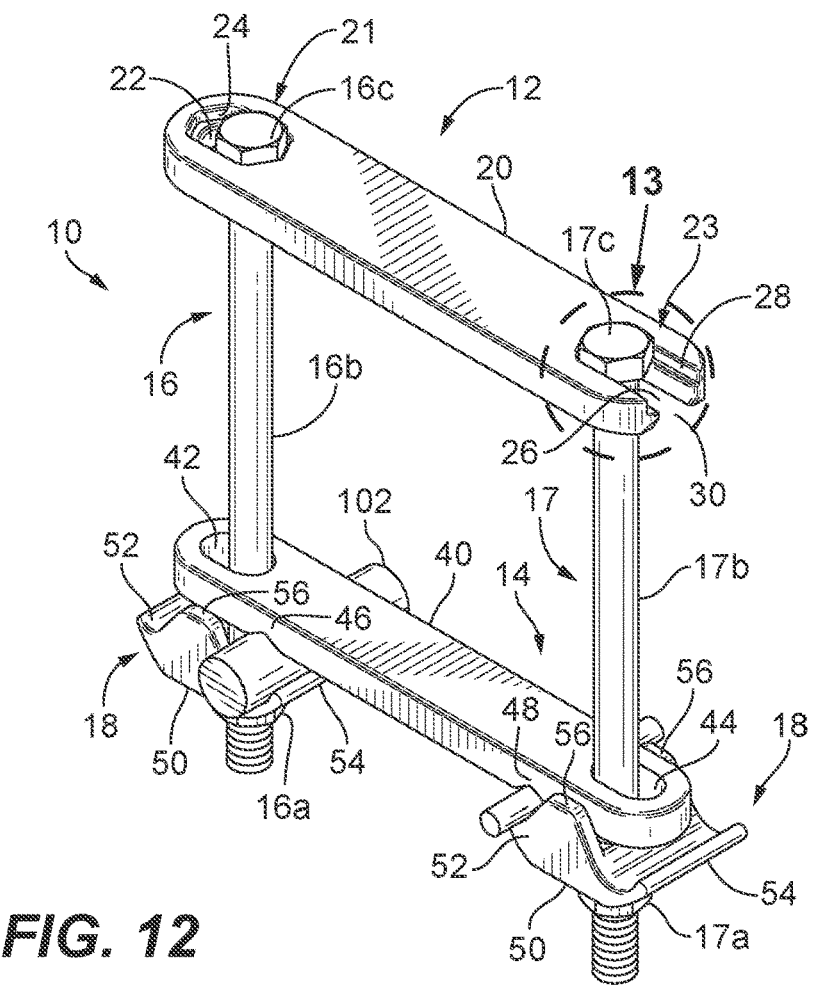
FIG. 12 is a top perspective view of another exemplary configuration of an electrical clamp according to the present disclosure.
Figure 13:
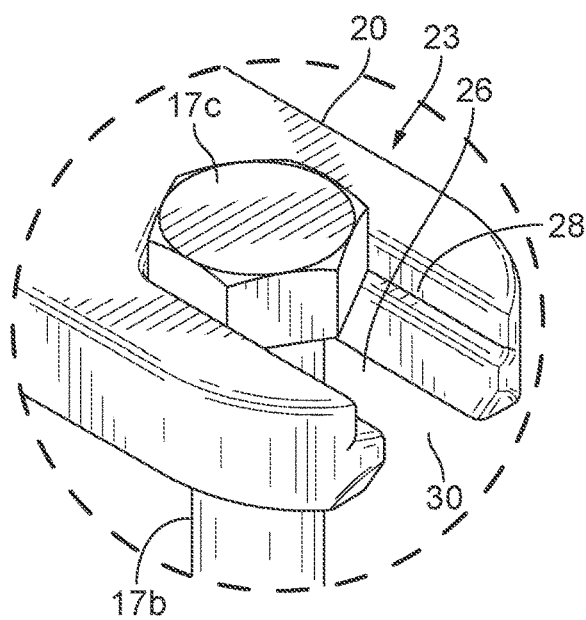
FIG. 13 is an enlarged view of a fastener caption portion of an upper saddle of the electrical clamp of FIG. 12.

The upper saddle 12 as shown in FIG. 12, lower saddle 14, fasteners 16 and 17 as shown in FIG. 12, and the clamp caps 18 are made of an electrically conductive material to facilitate establishing an electrical connection or an electrically conductive path between the electrical clamp 10, an object secured to the electrical clamp and a conductor 102 attached to the electrical clamp. This electrically conductive material also has sufficient strength to be secured to an object. In the exemplary configurations of the present disclosure, the upper saddle 12, lower saddle 14, fasteners 16 and 17, and clamp caps 18 can be made of electrically conductive metals. Examples of such metals include cast copper alloys, copper, steel, stainless steel, galvanized steel, silicon bronze, tin, aluminum, or aluminum alloy. These electrical clamp components can be made of the same electrically conductive materials, or different electrically conductive metals. In one exemplary configuration, the upper saddle 12 and lower saddle 14, and the clamp cap 18 can be made of cast copper alloy, while the fasteners 16 and 17 can be made of silicon bronze Referring now to FIGS. 12 and 13, another exemplary configuration of the electrical clamp 10 according to the present disclosure is shown. In this exemplary configuration, the electrical clamp 10 has an upper saddle 12 and a lower saddle 14 that are interconnected via fasteners 16 and 17, and one or more clamp caps 18. In this exemplary configuration, the upper saddle 12, the lower saddle 14, and the clamp cap 18 are substantially the same as the upper saddle 12, the lower saddle 14 and clamp cap 18 described above, and for ease of description are not reproduced here. However, in this exemplary configuration, the second fastener capture portion 23 of the upper saddle 12 differs. The second fastener capture portion 23 includes the aperture 26 and recess 28 without the blockers 32 in the channel 30 so that the electrical clamp 10 can be quickly and easily installed around the object 100 without the need to disassemble the electrical clamp 10.

Figure 14:
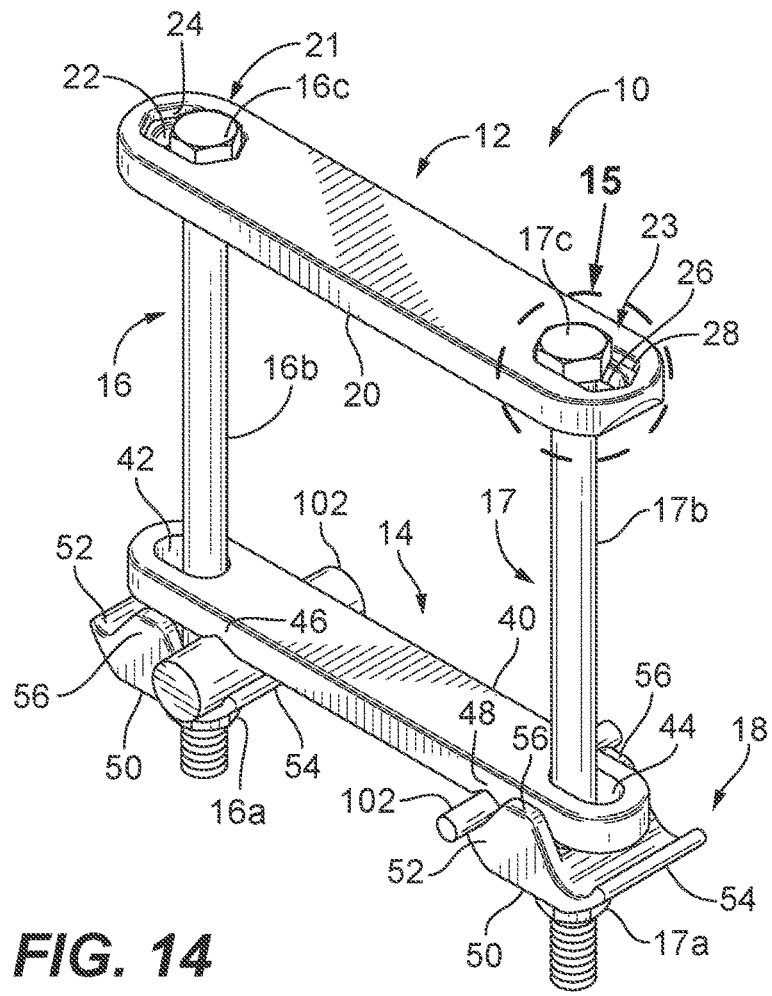
FIG. 14 is a top perspective view of another exemplary configuration of an electrical clamp according to the present disclosure.
Figure 15:
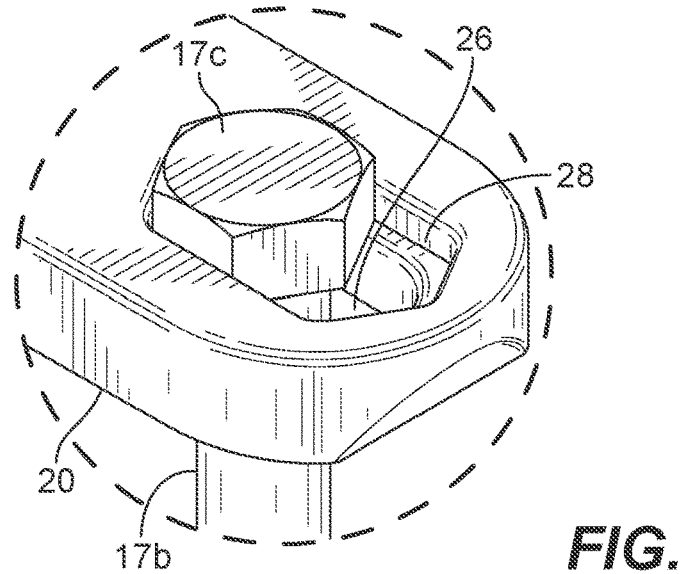
FIG. 15 is an enlarged view of a fastener caption portion of an upper saddle of the electrical clamp of FIG. 14.

Referring to FIGS. 14 and 15, another exemplary configuration of the electrical clamp 10 according to the present disclosure is shown. In this exemplary configuration, the electrical clamp 10 has an upper saddle 12 and a lower saddle 14 that are interconnected via fasteners 16 and 17, and one or more clamp caps 18. In this exemplary configuration, the upper saddle 12, the lower saddle 14 and the clamp cap 18 are substantially the same as the upper saddle 12, the lower saddle 14 and clamp cap 18 described above, and for ease of description are not reproduced here. However, in this exemplary configuration, the second fastener capture portion 23 of the upper saddle 12 differs. The second fastener capture portion 23 includes the aperture 26 and an enclosed recess 28, as shown, without channel 30.

Figure 16:
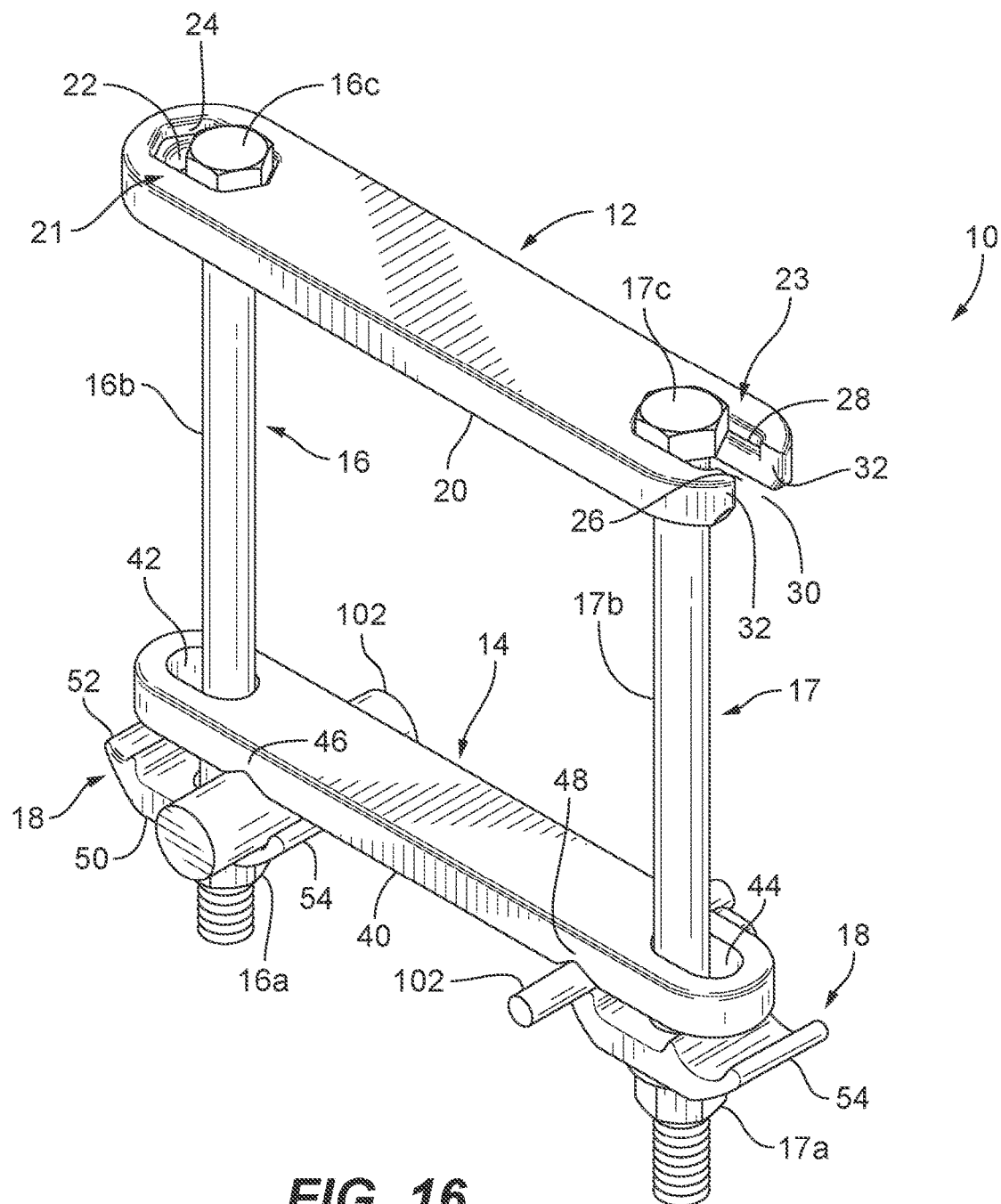
FIG. 16 is a top perspective view of another exemplary configuration of an electrical clamp according to the present disclosure.

Referring to FIG. 16, another exemplary configuration of the electrical clamp 10 according to the present disclosure is shown. In this exemplary configuration, the electrical clamp 10 has an upper saddle 12 and a lower saddle 14 that are interconnected via fasteners 16 and 17, similar to the configuration of FIGS. 1 and 5, and for ease of description are not reproduced here. However, in this exemplary configuration, the clamp cap 18 differs in that the clamp cap 18 does not include the one or more rotation blocking members 56.

Figure 17:
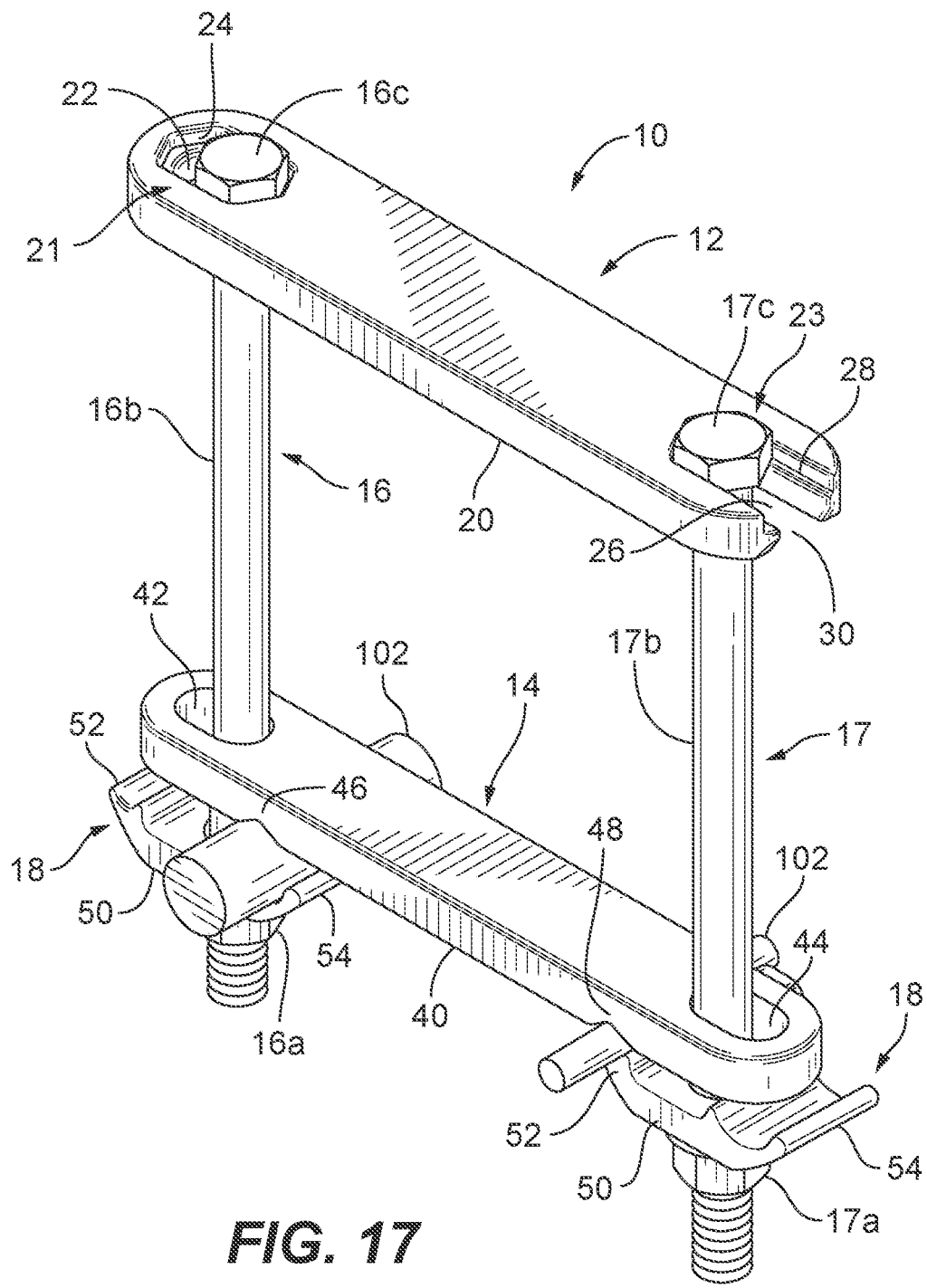
FIG. 17 is a top perspective view of another exemplary configuration of an electrical clamp according to the present disclosure.

Referring to FIG. 17, another exemplary configuration of the electrical clamp 10 according to the present disclosure is shown. In this exemplary configuration, the electrical clamp 10 has an upper saddle 12 and a lower saddle 14 that are interconnected via fasteners 16 and 17, and clamp cap 18 similar to the configuration of FIGS. 12 and 13, and for ease of description are not reproduced here. However, in this exemplary configuration, the clamp cap 18 differs in that the clamp cap does not include the one or more rotation blocking members 56.

Figure 18:
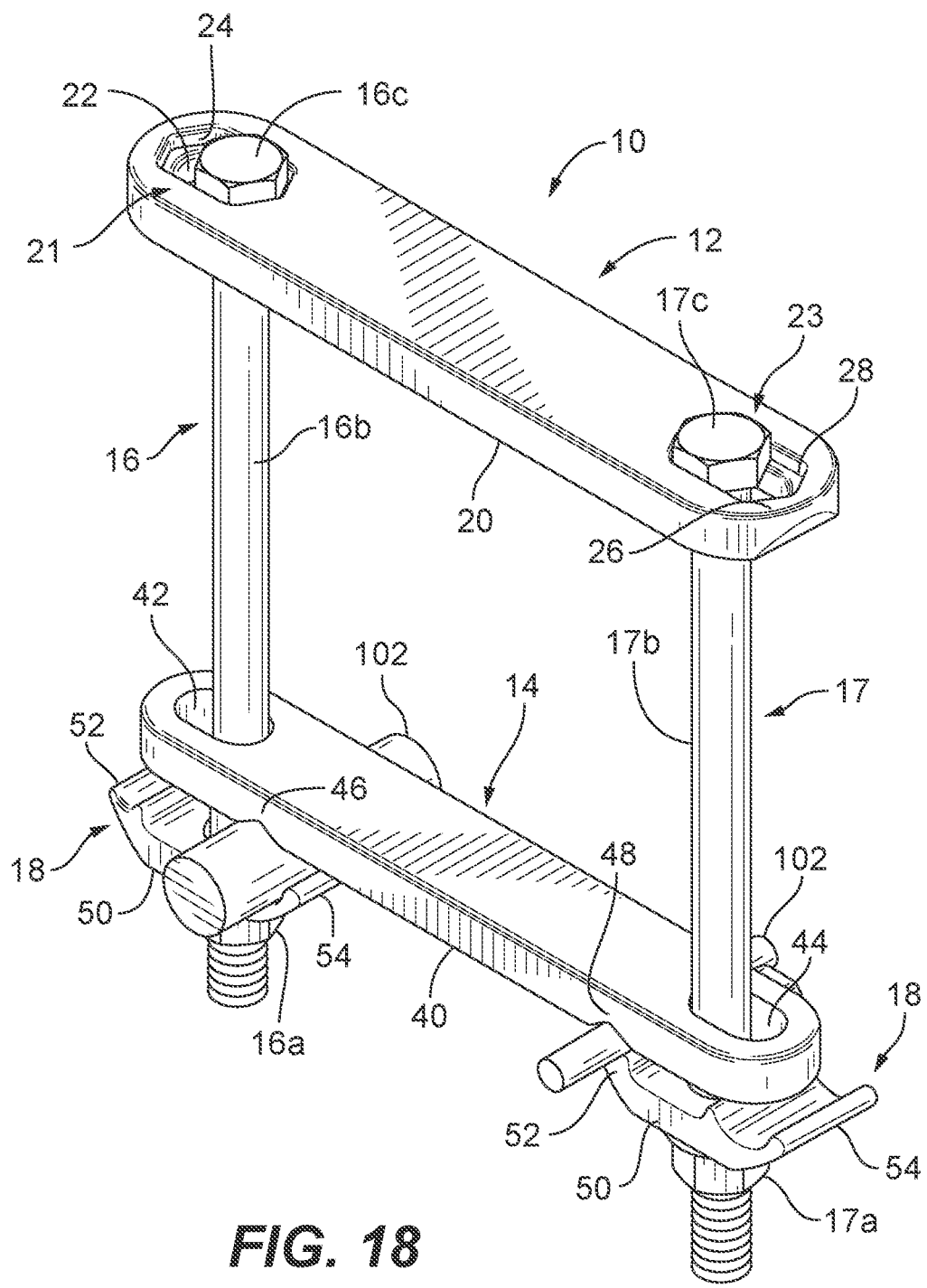
FIG. 18 is a top perspective view of another exemplary configuration of an electrical clamp according to the present disclosure.

Referring to FIG. 18, another exemplary configuration of the electrical clamp 10 according to the present disclosure is shown. In this exemplary configuration, the electrical clamp 10 has an upper saddle 12 and a lower saddle 14 that are interconnected via fasteners 16 and 17, and clamp cap 18 similar to the configuration of FIGS. 14 and 15, and for ease of description are not reproduced here. However, in this exemplary configuration, the clamp cap 18 differs in that the clamp cap does not include the one or more rotation blocking members 56.

Figure 19:
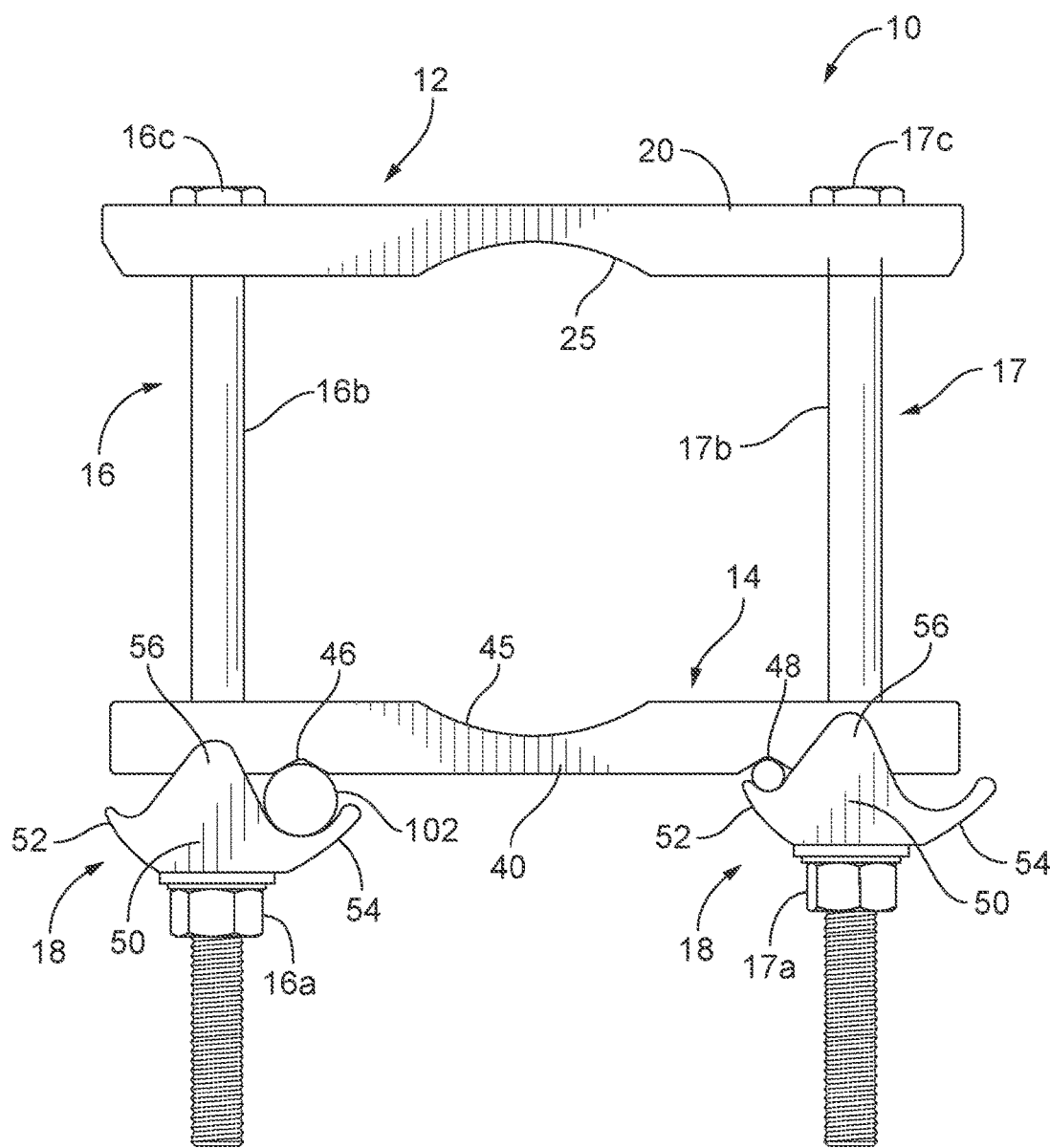
FIG. 19 is a front elevation view of another exemplary configuration of an electrical clamp according to the present disclosure.
Figure 20:
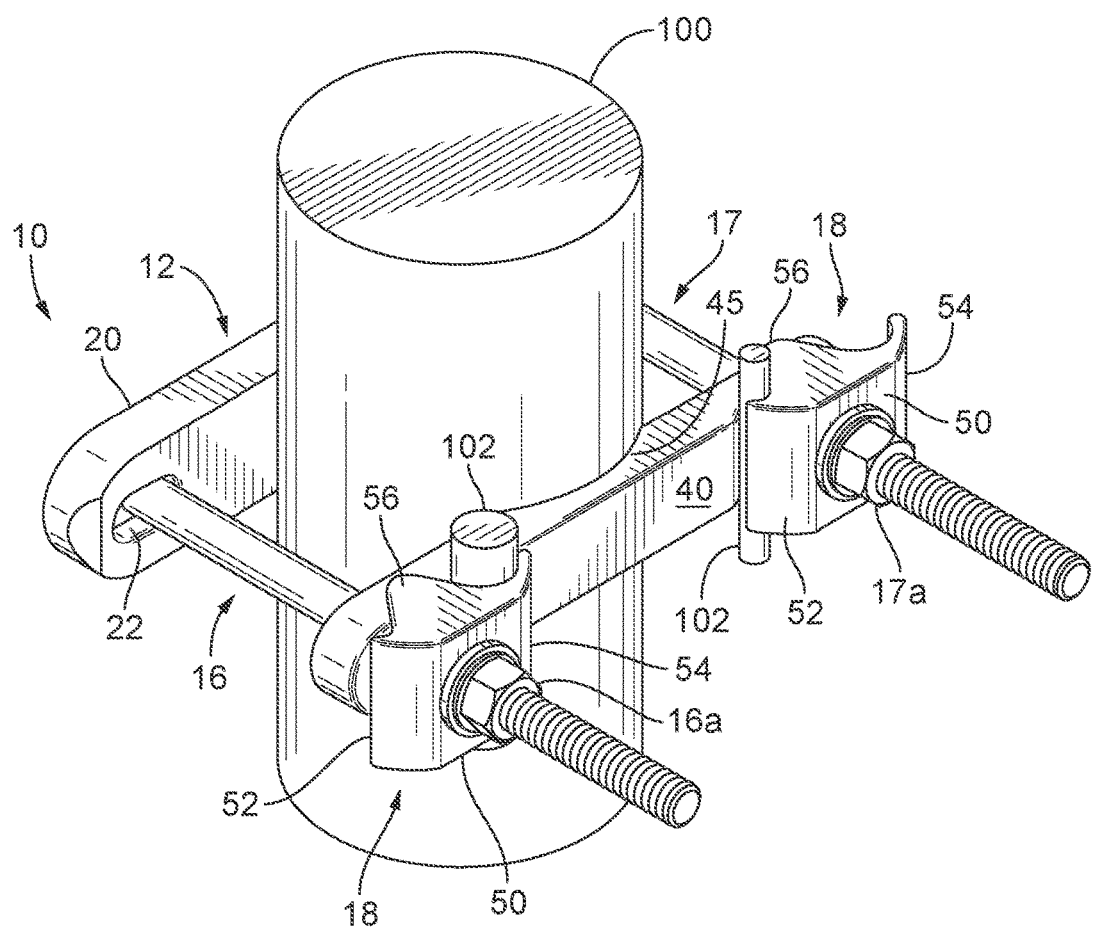
FIG. 20 is a top perspective view of the electrical clamp of FIG. 19 secured to an object having a circular geometry.

Referring now to FIGS. 19 and 20, another exemplary configuration of the electrical clamp 10 according to the present disclosure is shown. In this configuration, the electrical clamp is similar to the electrical clamp described in FIGS. 1-7, except the saddle body 20 in the upper saddle 12 includes an arcuate notch 25, and the saddle body 40 in the lower saddle 14 includes an arcuate notch 45. The notches 25 and 45 provide a circular geometry so that the electrical clamp 10 to be better secured to round or tubular objects 100, as seen in FIG. 20.

While illustrative configurations of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical clamp for grounding an object, the electrical clamp comprising:
    an upper saddle having an elongated saddle body capable of spanning the object and at least one fastener capture portion positioned adjacent an end of the upper saddle body;
    a lower saddle having an elongated saddle body capable of spanning the object and at least one lower saddle aperture positioned adjacent an end of the lower saddle body;
    at least one fastener extending between the at least one fastener capture portion and the at least one lower saddle aperture; and
    at least one clamp cap having a body with a clamp cap aperture for receiving the fastener, and at least one conductor arm protruding from a side of the clamp cap body and capable of securing a conductor between the at least one conductor arm and the lower saddle body; and
    wherein the at least one fastener capture portion comprises an aperture in the upper saddle body, a recess around the upper saddle aperture for receiving a portion of the fastener, a channel between the upper saddle aperture and an end of the upper saddle body that permits the fastener to pass through the channel into the upper saddle aperture, and at least one blocker positioned in the channel to block the at least one fastener from exiting the channel when the electrical clamp is secured to an object.

2. The electrical clamp according to claim 1, wherein the at least one clamp cap further comprises at least one rotation blocking member positioned to engage the lower saddle body to block rotation of the at least one clamp cap relative to the lower saddle body when the electrical clamp is secured to an object.

3. The electrical clamp according to claim 1, wherein the upper saddle, the lower saddle, at least one fastener and at least one clamp cap are made of an electrically conductive material.

4. The electrical clamp according to claim 3, wherein the electrically conductive material comprises cast alloy copper, copper, steel, stainless steel, galvanized steel, silicon bronze, tin, aluminum or cast aluminum.

5. The electrical clamp according to claim 1, wherein the upper saddle, the lower saddle and at least the one clamp cap are made of cast alloy copper.

6. The electrical clamp according to claim 1, wherein the at least one fastener is made of silicon bronze.

7. An electrical clamp for grounding an object, the electrical clamp comprising:
an upper saddle having an elongated saddle body capable of spanning the object and at least one fastener capture portion positioned adjacent an end of the upper saddle body;
a lower saddle having an elongated saddle body capable of spanning the object and at least one lower saddle aperture positioned adjacent an end of the lower saddle body;
at least one fastener extending between the at least one fastener capture portion and the at least one lower saddle aperture; and
at least one clamp cap having:
a body with a clamp cap aperture for receiving the fastener;
at least one conductor arm protruding from a side of the clamp cap body and capable of securing a conductor between the at least one conductor arm and the lower saddle body; and
at least one rotation blocking member positioned to engage the lower saddle body to block rotation of the at least one clamp cap relative to the lower saddle body when the electrical clamp is secured to the object; and
wherein the at least one fastener capture portion comprises an aperture in the upper saddle body, a recess around the upper saddle aperture for receiving a portion of the fastener, a channel between the upper saddle aperture and an end of the upper saddle body that permits the fastener to pass through the channel into the upper saddle aperture, and at least one blocker positioned in the channel to block the at least one fastener from exiting the channel when the electrical clamp is secured to an object.

8. The electrical clamp according to claim 7, wherein the upper saddle, the lower saddle, at least the one fastener and at least the one clamp cap are made of an electrically conductive material.

9. The electrical clamp according to claim 8, wherein the electrically conductive material comprises cast alloy copper, copper, steel, stainless steel, galvanized steel, silicon bronze, tin, aluminum or cast aluminum.

10. The electrical clamp according to claim 7, wherein the upper saddle, the lower saddle and at least the one clamp cap are made of cast alloy copper.

11. The electrical clamp according to claim 7, wherein the at least the one fastener is made of silicon bronze.

12. A electrical clamp for grounding an object, the electrical clamp comprising:
an upper saddle having an elongated saddle body capable of spanning the object and at least one fastener capture portion positioned adjacent an end of the upper saddle body;
a lower saddle having an elongated saddle body capable of spanning the object and at least one lower saddle aperture positioned adjacent an end of the lower saddle body;
at least one fastener extending between the at least one fastener capture portion and the at least one lower saddle aperture; and
at least one clamp cap having:
a body with a clamp cap aperture for receiving the fastener;
at least one conductor arm protruding from a side of the clamp cap body and capable of securing a conductor between the at least one conductor arm and the lower saddle body; and
at least one rotation blocking member positioned to engage the lower saddle body to block rotation of the at least one clamp cap relative to the lower saddle body when the electrical clamp is secured to an object.

13. The electrical clamp according to claim 12, wherein the at least one fastener capture portion comprises an aperture in the upper saddle body, a recess around the upper saddle aperture for receiving a portion of the fastener, a channel between the upper saddle aperture and an end of the upper saddle body that permits the fastener to pass through the channel into the upper saddle aperture, and at least one blocker positioned in the channel to block the at least one fastener from exiting the channel when the electrical clamp is secured to an object.

14. The electrical clamp according to claim 12, wherein the at least one fastener capture portion comprises an aperture in the upper saddle body, a recess around the upper saddle aperture for receiving a portion of the fastener, and a channel between the upper saddle aperture and an end of the upper saddle body that permits the fastener to pass through the channel into the upper saddle aperture.

15. The electrical clamp according to claim 12, wherein the at least one fastener capture portion comprises an aperture in the upper saddle body, and a recess around the upper saddle aperture for receiving a portion of the fastener.

16. An electrical clamp for grounding an object, the electrical clamp comprising:
an upper saddle having an elongated saddle body capable of spanning the object, and first and second fastener capture portions each positioned adjacent an end of the upper saddle body;
a lower saddle having an elongated saddle body capable of spanning the object, and first and second lower saddle apertures each positioned adjacent an end of the lower saddle body;
first and second fasteners extending between the upper saddle and the lower saddle, wherein the first fastener extends from the first fastener capture portion to the first lower saddle aperture, and the second fastener extends from the second fastener capture portion to the second lower saddle aperture; and
first and second clamp caps, wherein the first clamp cap is positioned adjacent to the first lower saddle aperture, and the second clamp cap is positioned adjacent the second lower saddle aperture, wherein each clamp cap comprises:
a body with a clamp cap aperture for receiving the fastener;
at least one conductor arm protruding from a side of the clamp cap body and capable of securing a conductor between the at least one conductor arm and the lower saddle body; and
at least one rotation blocking member positioned to engage the lower saddle body to block rotation of the at least one clamp cap relative to the lower saddle body when the electrical clamp is secured to an object.

17. The electrical clamp according to claim 16, wherein the upper saddle, the lower saddle, the first and second fasteners, and the first and second clamp caps are made of an electrically conductive material.

18. The electrical clamp according to claim 17, wherein the electrically conductive material comprises cast alloy copper, copper, steel, stainless steel, galvanized steel, silicon bronze, tin, aluminum or cast aluminum.

19. The electrical clamp according to claim 16, wherein the upper saddle, the lower saddle, and the first and second clamp caps are made of cast alloy copper.

20. The electrical clamp according to claim 16, wherein the first and second fasteners are made of silicon bronze.

* * * * *